US007412297B2

United States Patent
Chang et al.

(10) Patent No.: US 7,412,297 B2
(45) Date of Patent: Aug. 12, 2008

(54) METHOD AND SYSTEM FOR DESIGNING AND MANUFACTURING LENS MODULES

(75) Inventors: Chir-Weei Chang, Hsinchu Hsien (TW); Chy-Lin Wang, Hsinchu (TW); Wei-Chung Chao, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 24 days.

(21) Appl. No.: 11/510,627

(22) Filed: Aug. 28, 2006

(65) Prior Publication Data

US 2007/0153271 A1 Jul. 5, 2007

(30) Foreign Application Priority Data

Dec. 29, 2005 (TW) .............. 94147168 A

(51) Int. Cl.
*G06F 19/00* (2006.01)
*G05B 13/02* (2006.01)
*G02C 7/02* (2006.01)

(52) U.S. Cl. .......................... 700/117; 700/31; 700/36; 700/97; 700/105; 700/109; 700/157; 702/81; 351/177

(58) Field of Classification Search .................. 700/31, 700/36, 49, 97, 103–105, 108–110, 117, 700/157, 158, 173, 174, 182; 702/81, 82, 702/84, 182, 183, 185; 703/6; 351/177; 356/337, 338

See application file for complete search history.

(56) References Cited

U.S. PATENT DOCUMENTS

| 5,067,067 | A | * | 11/1991 | Estelle et al. ................. 700/36 |
| 5,748,482 | A | * | 5/1998 | Nishimura .................. 700/164 |
| 5,982,931 | A | * | 11/1999 | Ishimaru ..................... 382/218 |
| 6,567,226 | B2 | * | 5/2003 | Fuse .......................... 359/563 |
| 2003/0017794 | A1 | * | 1/2003 | Kozakai et al. ............. 451/284 |
| 2004/0075809 | A1 | * | 4/2004 | Wildsmith et al. .......... 351/177 |
| 2005/0157254 | A1 | * | 7/2005 | Shinohara et al. ........... 351/158 |

* cited by examiner

*Primary Examiner*—Sean Shechtman
(74) *Attorney, Agent, or Firm*—Birch, Stewart, Kolasch & Birch, LLP

(57) ABSTRACT

A method for designing and manufacturing lens modules includes selecting design parameters from a design database stored with the design parameters suitable for a lens module desired to be manufactured to design the lens module according to characteristics of the lens module and storing the design parameters of the lens module in an analysis database, analyzing the lens module based on a predetermined analysis process to generate analysis parameters corresponding to the lens module and storing the generated analysis parameters in the analysis database, and re-designing the lens module based on the analysis parameters stored in the analysis database.

23 Claims, 2 Drawing Sheets

METHOD AND SYSTEM FOR DESIGNING AND MANUFACTURING LENS MODULES

BACKGROUND OF THE INVENTION

1. Field of the Invention

This invention relates to lens modules, and more particularly, to a method and system for designing and manufacturing lens modules.

2. Description of Related Art

Compared with information industry, optics industry has a higher gross profit margin, but is much more similar to conventional industry. Optics industry has to rely on skilled and experienced workers, especially the workers in developed countries such as Japan, to design and manufacture perfect optic products. Moreover, it generally takes a long time to design a new model of optic product, so it happens sometimes that the new model of optic product, though having been designed completely, cannot be manufactured in result.

To solve the above-mentioned problem, U.S. Pat. No. 5,067,067 "METHOD FOR EVALUATING AND DESIGNING LENSES" further adds a cost and a manufacturing capability, both of which are factors having to be taken into consideration when manufacturing lenses, to a merit function when designing a lens. Therefore, a lens designer, when executing an optimization process, can further take the manufacture-related factors into consideration.

However, a primary objective of the prior art is to promote the manufacturability of lens products. Taking the manufacture-related factors further into consideration when the optimization process is performed has been a help to the manufacturability of lens products, but promoting the manufacturability of lens products is not one of the most urgent issues in the art. Moreover, the prior art does not provide any help to solving problems happening in recent years when designing lenses, lens modules or optic system, and has been out of date.

SUMMARY OF THE INVENTION

In views of the above-mentioned problems of the prior art, it is a primary objective of the present invention to provide a method and system for designing and manufacturing lens modules, to solve the problems of the prior art.

To achieve the above-mentioned and other objectives, a method for designing and manufacturing a lens module is provided according to the present invention. The method includes selecting design parameters from a design database having a plurality of design parameters in accordance with characteristics of a lens module desired to be designed, designing the lens module according to the selected design parameters, and storing the selected design parameters of the lens module in an analysis database; analyzing the lens module according to a predetermined analysis process to generate analysis parameters corresponding to the lens module, so as to show quality problems of the lens module due to manufacturing, light engine interface and assembly, and storing the quality problems and the analysis parameters corresponding to the lens module into the analysis database; and re-designing the lens module in accordance with the analysis parameters stored in the analysis database with information obtained after the lens module has been manufactured, so as to adjust precision of the method.

According to the preferred embodiment, the manufacture parameters include injection molding, glass molding, grinding and polishing, and mold fabricating-related parameters, the design parameters are classified into an optic part and a mechanism part, and include an optic type, an optic primary specifications and claims of the lens module, and the method takes the design parameters in both the optic part and the mechanism part into consideration when designing the lens module; The lens module is designed by the use of an auxiliary optic design selection and patent design-around of an expert system; The lens module is designed by the use of individual software, or integrated optic and mechanism design software; The method further stores the lens module-related information and the design parameters corresponding to the lens module in a case database when design the lens module and storing the design parameters of the lens module into the analysis database; The method further generates manufacturing parameters corresponding to the lens module when analyzing the lens module according to the predetermined analysis process; The predetermined analysis process adopts a tolerance analysis to distribute the design parameters and the manufacture parameters of the lens module, and grade assembly capability of the lens module when adopting the tolerance analysis to analyze the lens module; The method further grades basic optic and mechanism manufacture capability parameters of the lens module when adopting the tolerance analysis to analyze the lens module; The method further classifies optic errors of the lens module into a symmetric part and an asymmetric part when adopting the tolerance analysis to analyze the lens module, and the symmetric and asymmetric errors can be decrease through the adjustment of degrees of freedom of axial direction and lateral direction compensation components of the lens module, so as to optimize the yield rate and reduce the cost of the lens module; The method further includes classifying the symmetric and asymmetric optic errors systematically through the use of a bargain-basement model, to classify the bargain-basement model which are serious or which usually happens; The method further includes performing a failure symptom test in accordance with analysis results analyzed by the bargain-basement model with an automatic or semi-automatic test instrument to discover any flaws of the lens module, and adopting a quality engineering method to evaluate and infer reasons why the flaws exist in the lens module according to the flaws of the lens module; The quality engineering method is Taguchi method; The method further combines a shop floor control system to collect manufacture and quality data when performing the failure symptom test in accordance with analysis results analyzed by the bargain-basement model with the automatic or semi-automatic test instrument to discover the flaws of the lens module.

To achieve the above-mentioned and other objectives, a system for designing and manufacturing a lens module is provided according to the present invention. The system includes a design database having a plurality of design parameters; a design module coupled to the design database for selecting from the design database design parameters suitable for the lens module according to characteristics of the lens module, to design the lens module; an analysis module for analyzing the lens module designed by the design module in accordance with a predetermined analysis process, and generating analysis parameters corresponding to the lens module, so as to shown quality problems of the lens module due to manufacturing, light engine interface and assembly; and an analysis database for storing the design parameters, the analysis parameters and the quality problems analyzed by the analysis module; wherein the design module further re-design the lens module in accordance with the analysis parameters stored in the analysis database with information obtained after the lens module has been manufactured, so as to adjust precision of the system.

Compared with the prior art, the method and system for designing and manufacturing lens modules of the present invention accumulate valuable experiences of developing optic products. Therefore, the manufacturability of the optic products is increased, and the risk of developing the new model of optic products is decreased accordingly, and the optic industry as a whole is more competitive.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
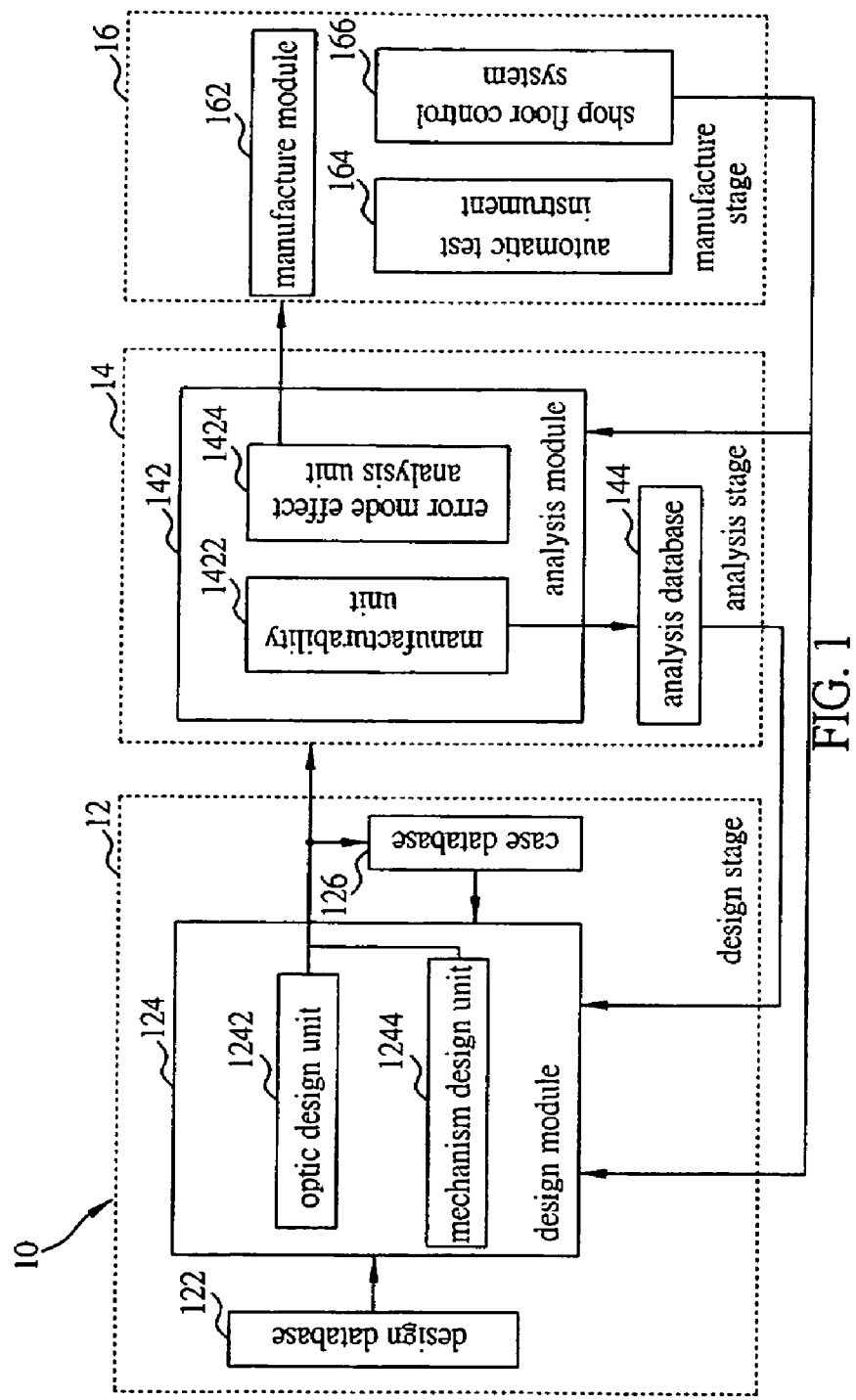
FIG. 1 is a functional block diagram of an integrated lens module designing and manufacturing system of the preferred embodiment according to the present invention.

FIG. 1 is a functional block diagram of an integrated lens module designing and manufacturing system 10 of the preferred embodiment according to the present invention. The system 10 is used for designing and manufacturing lens modules. The system 10 integrates a design stage 12, an analysis stage (or called a manufacturability confirmation stage) 14 and a manufacture state 16, all of which are necessary for a lens module to be manufactured.

The design stage 12 comprises a design database 122, a design module 124 and a case database 126. The design database 122 comprises varieties of design parameters, such as optic types, optic primary specifications and claims of lens modules, which are classified into an optic part and a mechanism part. Accordingly, the design module 124, which is used for designing a lens module, comprises an optic design unit 1242 and a mechanism design unit 1244 for selecting design parameters, which belong to either the optic part or the mechanism par, suitable for the lens module from the design database 122 according to characteristics of the lens module, and designing an optic part and a mechanism part of the lens module respectively.

According to the preferred embodiment, the design module 124 adopts an auxiliary optic design selection and patent design-around lens module, like an expert system. The design module 124, when designing the lens module, will takes into consideration the optic part and the mechanism part altogether. Moreover, the design module 124 adopts individual software, or integrated optic and mechanism design software to execute a design process for the lens module. After completing the design of the lens module, the design module 124 stores the lens module-related information and the design parameters corresponding to the lens module into the case database 126, no matter whether the designed lens module is granted a patent, as a case for another designer when designing a new lens module.

The analysis stage 14 comprises an analysis module 142 and an analysis database 144. A manufacturability unit 1422 of the analysis module 142 analyzes the lens module in accordance a predetermined analysis process, and generates analysis parameters corresponding to the lens module. The analysis database 144 is used for storing the design parameters and the analysis parameters of the lens module having been analyzed by the analysis module 142. Therefore, the design module 124 in the design stage 12 is allowed to re-design the lens module according to the lens module-related information and the analysis parameters generated by the analysis module 142 in the analysis stage 14 after analyzing the lens module. After repetition of many times of designing and analyzing processes, many valuable design parameters and analysis parameters corresponding to the design parameters are stored in the analysis database 144, and the another designer is allowed to make a reference of the great number of analysis parameters already stored in the analysis database 144 when designing the new lens module, without the necessity to relying on skilled and experienced workers. The new lens module designed by the system 10 of the present invention can therefore have a satisfied manufacturability, and the another designer can get rid of any risk of developing the new model of optic products.

According to the preferred embodiment, the manufacturability unit 1422 of the analysis module 142, when analyzing the lens module in accordance with the predetermined analysis process, further generates manufacture parameters corresponding to the lens module. Moreover, the predetermined analysis process adopts a tolerance analysis to distribute the design parameters and the manufacture parameters of the lens module as reasonable as possible. According to the preferred embodiment, the manufacture parameters comprise injection molding, glass molding, grinding and polishing, and mold fabricating-related parameters. An error mode effect analysis unit (failure mode effect analysis, FMEA) 1424 of the analysis module 142, when adopting the tolerance analysis to analyze the lens module, grades assembly capability parameters and basic optic and mechanism manufacture capability parameters of the lens module, and classifies optic errors of the lens module into a symmetric part and an asymmetric part, both of which can be decreased by adjusting degrees of freedom of axial direction and lateral direction compensation components of the lens module, so as to optimize the yield rate and reduce the cost of the lens module.

The manufacture stage 16 comprises a manufacture module 162, an automatic (or semi-automatic) test instrument 164, and a shop floor control system 166. The manufacture module 162 manufactures the lens module in accordance with the manufacture parameters obtained from the above-described simulated analysis process of the virtual manufacture. The automatic test instrument 164 performs a failure symptom test on a bargain-basement model according to the error mode effect analysis unit (failure mode effect analysis, FMEA) 1424, to discover any flaws of the lens module. The automatic test instrument 164 further, in accordance with the flaws of the lens module, adopts a quality engineering method such as Taguchi method to evaluate and infer the reasons why the flaws exist in the lens module. The shop floor control system 166 is used for collecting manufacture and quality data of the lens module. The manufacture and quality data can be fed back to the design module 124 and analysis module 142, as an amendment basis for succeeding design and analysis processes.

Each of the stages and modules of the integrated lens module designing and manufacturing system 10 of the present invention can operates together with the others, or operate individually. The integrated lens module designing and manufacturing system 10 of the present invention is applied to a variety of fields, such as a database of the lens module, optic ultra-precisely manufacturing, light engine designing, mechanism manufacturing tolerance, lens clamping and assembly tolerance and interfaces thereof.

Figure 2:
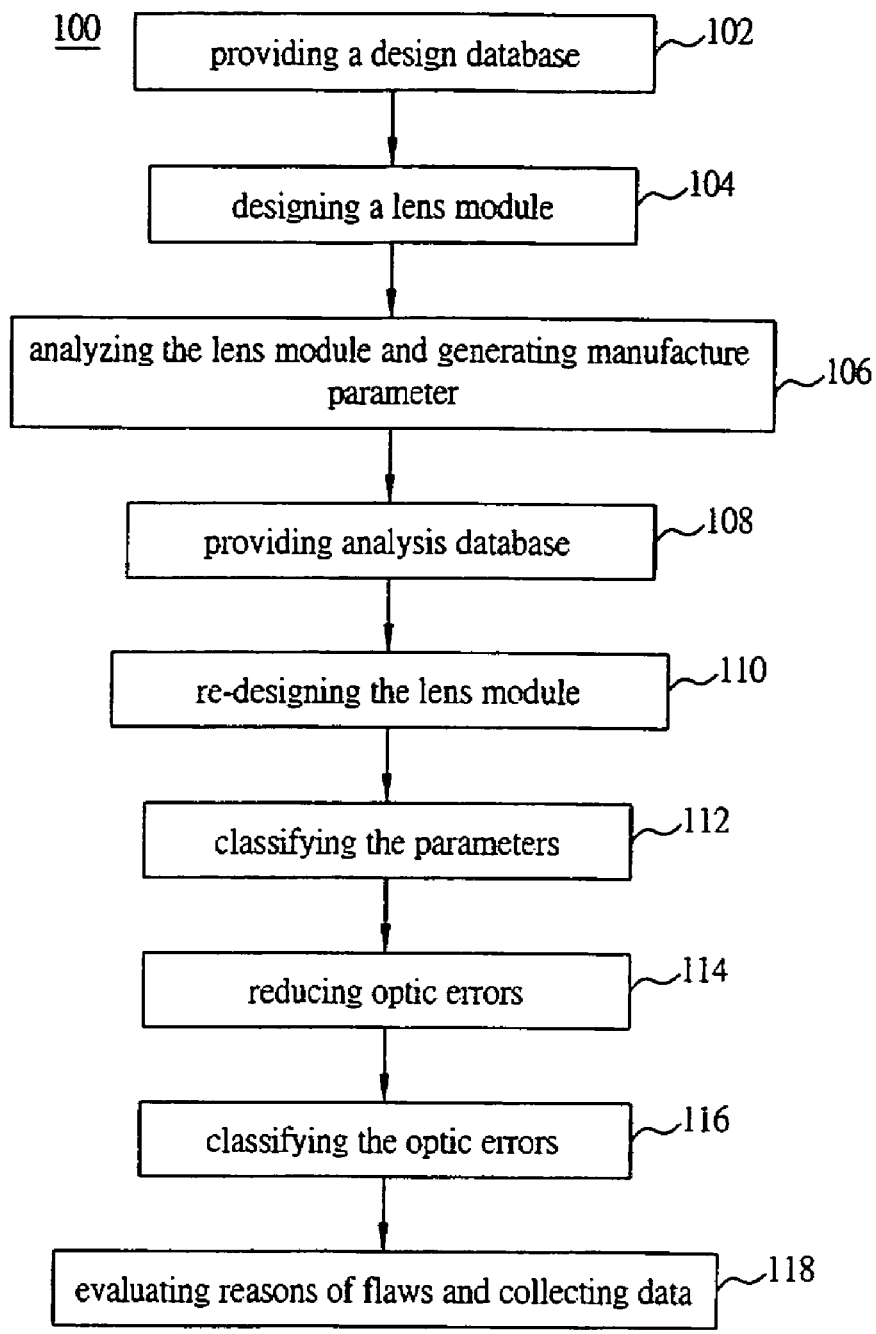
FIG. 2 is a flow chart of an integrated lens module designing and manufacturing method corresponding to the system shown in FIG. 1.

FIG. 2 is a flow chart of an integrated lens module designing and manufacturing method 100 corresponding to the lens module designing and manufacturing system 10. The method 100 starts in step 102.

In step 102, the method provides the design database 122, which comprises the design parameters. The method proceeds to step 104.

In step 104, the method selects design parameters suitable for the lens module from the design database 122 according to the characteristics of the lens module, and designs the lens module. The method proceeds to step 106.

In step 106, the method, in accordance with the predetermined analysis process, analyzes the lens module, and generates analysis parameters and manufacturing parameters corresponding to the lens module. In step 106, any quality problems of the lens module due to manufacturing, light engine interface and assembly are shown. The method proceeds to step 108.

In step 108, the method provides the analysis database, and stores all of the quality problems, the design parameters of the lens module, and the analysis parameters corresponding to the lens module into the analysis database 144. The method proceeds to step 110.

In step 110, the method, in accordance with the analysis parameters stored in the analysis database 144, re-designs the lens module with information (such as test information and manufacturing information) obtained after the lens module has been manufactured. At this point, the designer is allowed to make a reference of not only the design parameters stored in the design database 122, but also the analysis parameters stored in the analysis database 144, to re-design the lens module, without the necessity to relying on the skilled and experienced workers. The method proceeds to step 112.

In step 112, the method adopts the tolerance analysis to distribute the design parameters and the manufacture parameters of the lens module as reasonable as possible, and further grades the assembly capability parameters and the basic optic and mechanism manufacture capability parameters of the lens module. The optic errors of the lens module are classified into the symmetric part and the asymmetric part. The method proceeds to step 114.

In step 114, the method adjusts the degrees of freedom of the axial direction and lateral direction compensation components of the lens module, so as to optimize the yield rate and reduce the cost of the lens module. The method proceeds to step 116.

In step 116, the method classifies the symmetric and asymmetric optic errors systematically through the use of the bargain-basement model, to classify the bargain-basement model which are serious or which usually happens. The method proceeds to step 118.

In step 118, the method, in accordance with the analysis result analyzed by the bargain-basement model, performs the failure symptom test with the automatic or semi-automatic test instrument, to discover any flaws of the lens module. The method further, in accordance with the flaws of the lens module, adopts a quality engineering method such as Taguchi method to evaluate and infer the reasons why the flaws exist in the lens module, and collects the manufacture and quality data of the lens module with the shop floor control system.

Compared with the prior art, the method and system for designing and manufacturing lens modules of the present invention accumulate valuable experiences of developing optic products. Therefore, the manufacturability of the optic products is increased, and the risk of developing the new model of optic products is decreased accordingly, and the optic industry as a whole is more competitive.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A method for designing and manufacturing a lens module, the method comprising:

selecting design parameters from a design database having a plurality of design parameters in accordance with characteristics of a lens module desired to be designed, designing the lens module according to the selected design parameters, and storing the selected design parameters of the lens module in an analysis database;

analyzing the lens module according to a predetermined analysis process to generate analysis parameters and manufacturing parameters corresponding to the lens module, so as to show quality problems of the lens module due to manufacturing, light engine interface and assembly, and storing the quality problems and the analysis parameters corresponding to the lens module into the analysis database, the predetermined analysis process adopting a tolerance analysis to distribute the design parameters and the manufacture parameters of the lens module and classify optic errors of the lens module into a symmetric part and an asymmetric part; and re-designing the lens module in accordance with the analysis parameters stored in the analysis database with information obtained after the lens module has been manufactured, so as to adjust precision of the method.

2. The method of claim 1, wherein the design parameters comprise an optic type, an optic primary specifications and claims of the lens module.

3. The method of claim 1, wherein the lens module is designed by the use of an auxiliary optic design selection and patent design-around of an expert system.

4. The method of claim 1, wherein the design parameters are classified into an optic part and a mechanism part.

5. The method of claim 4 taking the design parameters in both the optic part and the mechanism part into consideration when designing the lens module.

6. The method of claim 4, wherein the lens module is designed by the use of individual software, or integrated optic and mechanism design software.

7. The method of claim 1 further storing lens module-related information and the design parameters corresponding to the lens module in a case database when designing the lens module and storing the design parameters of the lens module into the analysis database.

8. The method of claim 1 further grading assembly capability of the lens module when adopting the tolerance analysis to analyze the lens module.

9. The method of claim 1 further grading basic optic and mechanism manufacture capability parameters of the lens module when adopting the tolerance analysis to analyze the lens module.

10. The method of claim 1 further comprising adjusting degrees of freedom of axial direction and lateral direction compensation components of the lens module, so as to decrease the symmetric and asymmetric errors, and optimize a yield rate and reduce a cost of the lens module.

11. The method of claim 1, wherein the manufacture parameters comprise injection molding, glass molding, grinding and polishing, and mold fabricating-related parameters.

12. A computer-readable medium having computer-executable instructions and installed in a system for designing and manufacturing a lens module, the system comprising a design database, a design module coupled to the design database, an analysis module and an analysis database, the analysis module comprising an error mode effect analysis unit, the design database comprising a plurality of design parameters, the computer-executable instructions, when executed, performing:

actuating the design module to select from the design database design parameters suitable for the lens module according to characteristics of the lens module, to design the lens module;

actuating the analysis module to analyze the lens module designed by the design module in accordance with a predetermined analysis process, and generate analysis parameters and manufacturing parameters corresponding to the lens module, so as to show quality problems of the lens module due to manufacturing, light engine interface and assembly, the predetermined analysis process adopting a tolerance analysis to distribute the design parameters and the manufacture parameters of the lens module;

actuating the error mode effect analysis unit to classify optic errors of the lens module into a symmetric part and an asymmetric part;

storing the design parameters, the analysis parameters and the quality problems analyzed by the analysis module in the analysis database; and actuating the design module to further re-design the lens module in accordance with the analysis parameters stored in the analysis database with information obtained after the lens module has been manufactured, so as to adjust precision of the system.

13. The computer-readable medium of claim 12, wherein the design parameters comprise an optic type, an optic primary specifications and claims of the lens module.

14. The computer-readable medium of claim 12, wherein the design module designs the lens module through the use of an auxiliary optic design selection and patent design-around of an expert system.

15. The computer-readable medium of claim 12, wherein the design parameters are classified into an optic part and a mechanism part, and the design module comprises an optic design unit and a mechanism design unit for selecting, in accordance with the characteristics of the lens module, the design parameters in the optic part and the mechanism part suitable for the lens module, to design an optic part and a mechanism part of the lens module respectively.

16. The computer-readable medium of claim 15, wherein the design module takes the design parameters in both the optic part and the mechanism part into consideration when designing the lens module.

17. The computer-readable medium of claim 15, wherein the lens module adopts individual software, or integrated optic and mechanism design software to design the lens module.

18. The computer-readable medium of claim 12 further comprising a case database for storing lens module-related information and the design parameters corresponding to the lens module after the design module has designed the lens module.

19. The computer-readable medium of claim 12, wherein the analysis module further generates manufacturing parameters corresponding to the lens module when analyzing the lens module according to the predetermined analysis process.

20. The computer-readable medium of claim 19, wherein the analysis module comprises a manufacturability unit for analyzing the lens module in accordance with the predetermined analysis process, and generates the analysis parameters of the lens module.

21. The computer-readable medium of claim 20, wherein the manufacturability unit further grades assembly capability of the lens module when analyzing the lens module.

22. The computer-readable medium of claim 20, wherein the error mode effect analysis unit further grades basic optic and mechanism manufacture capability parameters of the lens module.

23. The computer-readable medium of claim 12, wherein the error mode effect analysis unit further adjusts degrees of freedom of axial direction and lateral direction compensation components of the lens module, so as to decrease the symmetric and asymmetric errors, and optimize a yield rate and reduce a cost of the lens module.

* * * * *